United States Patent [19]

Limone et al.

[11] 4,231,458
[45] Nov. 4, 1980

[54] CARD COMPRISING AN ELECTRONIC CIRCUIT WITH OBLITERABLE CREDIT ELEMENTS FOR THE DISTRIBUTION OF GOODS OR SERVICES

[76] Inventors: Mario Limone, Corso Durante, 292, Frattamaggiore (Napoli), Italy, 80027; Giovanni Russo, Via Petrarca, 20, Napoli, Italy, 80100; Umberto Magliuolo, Via Oberdan, 16/bis, Pozzuoli (Napoli), Italy, 80078; Salvatore Sardella, Via R. Caravaglios, 4, Fuorigrotta (Napoli), Italy, 80100

[21] Appl. No.: 860,229

[22] Filed: Dec. 13, 1977

[30] Foreign Application Priority Data

Dec. 14, 1976 [IT] Italy ............................... 52605 A/76

[51] Int. Cl.² ................................................ G07F 3/02
[52] U.S. Cl. ..................................... 194/4 F; 194/4 G
[58] Field of Search ............... 194/4 R, 4 C, 4 E, 4 F, 194/4 G

[56] References Cited

U.S. PATENT DOCUMENTS

| 3,087,018 | 4/1963 | Pferd | 194/4 E |
| 3,136,402 | 6/1964 | Smith | 194/4 E |
| 3,457,391 | 7/1969 | Yamamoto | 194/4 R |
| 3,678,250 | 7/1972 | Dethloff et al. | 194/4 R X |
| 3,760,924 | 9/1973 | Arita | 194/4 F |

FOREIGN PATENT DOCUMENTS

| 2421559 | 11/1974 | Fed. Rep. of Germany | 194/4 F |
| 2441343 | 2/1976 | Fed. Rep. of Germany | 194/4 F |

*Primary Examiner*—Joseph J. Rolla
*Attorney, Agent, or Firm*—Holman & Stern

[57] ABSTRACT

Disclosed is a card for the activation of automated machines for the rendering of services or dispensation of goods. The card comprises a support base, an authentication element, and a large-scale integrated circuit. The circuit includes a number of fuse elements, in a preferred embodiment arranged in a matrix, for storing a value attributable to the card which can be reduced by the machine in an amount equal to the goods dispensed or services rendered.

4 Claims, 3 Drawing Figures

CARD COMPRISING AN ELECTRONIC CIRCUIT WITH OBLITERABLE CREDIT ELEMENTS FOR THE DISTRIBUTION OF GOODS OR SERVICES

BACKGROUND OF THE INVENTION

The present invention refers to a card for the exaction and the identification constituted by an electronic circuit for the distribution of goods or services and machine operating on the same.

In many branches of commerce it is ever more increasing the employment of automatic machines which enable the distribution of goods or services, by the introduction of tokens, coins, tickets etc. etc.

Let us cite, among the other examples, soft-drinks, cigarette automatic distributors, self-service fuelling stations, underground accesses, and, as a typical example to which we will refer in the text, the public telephone boxes.

All these kinds of machines are affected by considerable disadvantages, in spite of their increasing employment.

First, we should point out the problem of false coins which allow the illicit distribution of goods and often cause the failure and blocking of the machine devices.

Secondly the fact that a lot of coins or tokens are accumulated in the collecting boxes of the machines, induces burglars to open them, causing evident damages.

With respect to telephone apparatus, let us cite another typical disadvantage.

The cost of the single telephone call is proportional to its length and it depends also upon the call distance (i.e. city-call, long-distance-call).

So, the more the cost, the more the user needs tokens or coins which sometimes are not easily available, i.e. during the night.

Moreover unemployed tokens and coins might cause considerable troubles because of their number and size.

These disadvantages and others have been overcome by the object of the present invention.

SUMMARY OF THE INVENTION

In fact, it is an object of the present invention to provide a card supplied with a sensible element, which permits the apparatus to identify immediately whether or not the card is able to allow the delivery of goods.

Another object of the present invention is to provide a card which is impossible to falsify.

Another object of the invention is to provide a card which eliminates the collection in the machine of coins or tokens in great amount.

Another object of the invention is to provide a card of comfortable size which can be utilized only for the desired fraction of its nominal value while remaining able to be further utilized up to the exhausting of its value.

The abovementioned objects have been achieved by a card provided with an integrated electronic circuit which constitutes both the identification logical key and a matrix of obliteratable elements which permits the obliteration of the amounts of value corresponding to the goods and services distributed.

Both the terminals of the logical key circuit and those of the matrix are connected through special conductors to small metal areas provided on the card by a diffusion process.

Said small metal areas constitute the electric contact between the distributing machine and the inserted card.

Initially, as the card is bought, the payment amount at the disposal of the user is proportional to the number of elements of the matrix; in operation, the distributing machine generates, in proportion to the amount of goods or services delivered, impulses which, appropriately elaborated, obliterate the elements of the matrix, so as to cancel the corresponding payment amount.

The control logic comprises a first part which constitutes the key and a second part which controls the reading operation and the obliteration of the elements of the matrix.

As the card is inserted, the machine generates appropriate signals which, after verifying the validity of the identification key which is included in the control logic, explore the matrix.

During the exploration it is investigated whether the payment amount is different from zero and in such a case, a signal is generated in order to enable the distribution and the subsequent payment by the obliterating action.

In order to provide the continuity of the service, it is possible to insert in the machine, during the operation, a second card; as the payment amount of the first card is exhausted, the card is returned and the machine will begin to operate on the second card.

Obviously at the end of the requested service, the card is returned back to the user with the unused payment amount. In operation, a digital display indicates continuosly the payment amount still at the disposal of the user.

BRIEF DESCRIPTION OF A PREFERRED EMBODIMENT

The present invention will be now described with reference to the attached drawing which show, as an example, a preferred embodiment of the card of the present invention.

Figure 1:
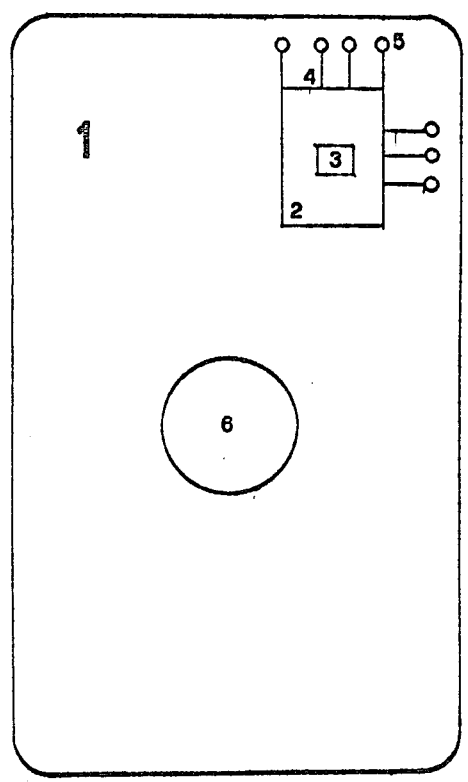
FIG. 1 shows a schematic plan view of the card of the present invention.

Referring now to FIG. 1, it shows a support base, made of cardboard, plastic or similar, on which is placed the sensible element 2 constituted by an integrated circuit 3, which, through a technical process well known to those skilled in the art, is connected by means of thin connecting wires to several metal paths 4 which end onto small contact areas 5.

Numeral reference 6 indicates a metal element which can assume the shape of a disk, as illustrate in FIG. 1, or the shape of thin wires, and through which a first approximated check of the validity of the card can be performed.

Figure 2:
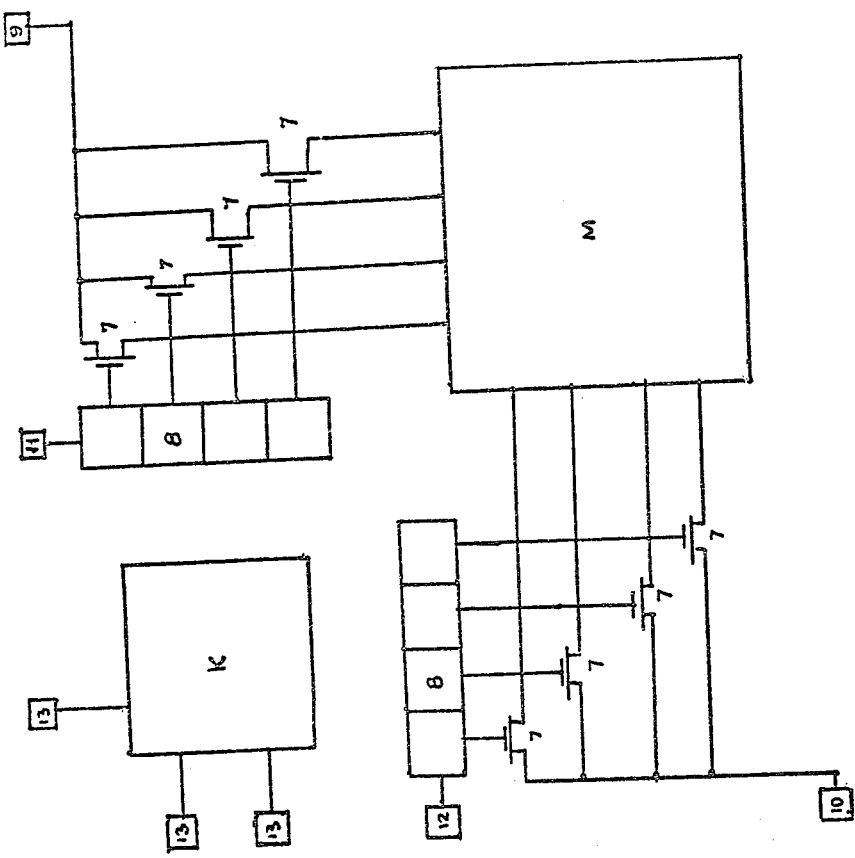
FIG. 2 shows schematically an electronic circuit which constitutes the sensible element of the card.

FIG. 2 shows schematically an embodiment of the electronic circuit 3 of FIG. 1.

It can be seen that element K is connected to three small areas of contact 13 which check the validity of the card in the manner described in the next.

A second element M indicates a matrix of obliteratable elements, sixteen in the present case, connected, through transistors 7, to a switching means including a pair of shift-registers 8 and to a pair of testing and obliterating terminals 9 and 10.

The shift-registers are connected to the output terminals 11 and 12 respectively.

Elements 9, 10, 11, 12, 13, which can be variable in number, depending upon the number of obliteratable elements of the matrix or upon the characteristics of the circuit K, correspond to metal paths 4 and to small contact areas 5 shown in FIG. 1.

Figure 3:
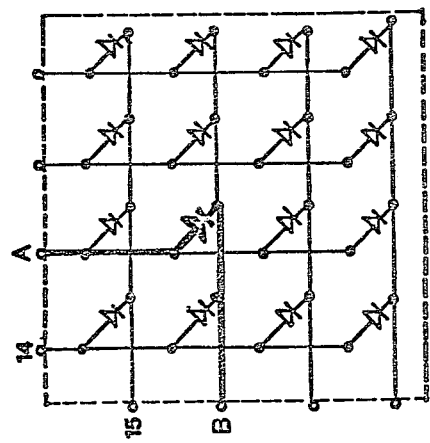
FIG. 3 shows a matrix obtained by a diode circuit.

FIG. 3 shows schematically the matrix M, arranged with 16 fuse elements. These elements are illustrated in the figure by diodes. To each of these diodes, as will be described below, can be applied a low voltage level which will permit to verify their operability and therefore their conductivity, or alternatively can be applied a voltage level sufficiently high so as to effect the destruction or obliteration of the diodes and interrupting their conductivity.

These elements of the matrix have been represented as diodes as one of the many technical way to obtain them, but any other element having fuse characteristic can be used in their place.

We shall now describe, in more detail, the operation of the card, starting from inserting the same in the machine.

The following disclosure will show the characteristics and the structure of the machine and they will become evident to those skilled in the art as soon as the operation of the card becomes clear and well specified.

It must be pointed out that several embodiments of the machine can be proposed, each being adapted to the use to which it is designated or being dependent upon the connection to the distributing apparatus or the service to be performed.

In the case, for example, of the fueling station, it appears to be more convenient, from industrial point of view, that the machine should be constituted by a part which recognizes the card, obliterates a portion of the matrix, and controls appropriately the apparatus which delivers the fuel. In such a case the machine will be provided with a keyboard or a programming section so that the user can easily perform his request of service for the desired amount; as the card is inserted, the machine identifies the key and delivers the requested amount of good and returns the card with the value reduced in proportion to the delivered goods.

In the case that the card has not been completely obliterated it will be possible to use it again until the value is completely exhausted. In the case of coffee machine distributors, or of similar goods, the machine can be integrated in the complete apparatus; in other words, in substitution of the coin introduction slot, one can provide a vent-hole wherein the card can be inserted. A more specific example is represented by the telephone apparatus; with regard to the assembling and embodying steps the machine can have a structure independent from the telephone apparatus or can be integrated with the same.

In the first case, the connection between the telephone apparatus and the machine modifies the telephone service but does not alter the apparatus; in the second case, the machine comprises the receiver, the dial or the keyboard, and supplies completely the telephone service.

In the following, the machine will be described with reference to the typical case of the telephone apparatus but it will be understood that it can be easily adapted to each of the cases before indicated.

In any case, with the connections indicated and upon insertion of the card, the machine will begin to operate as follows.

A suitable proximity sensor will check the presence of the metal disk 6 on the card and will effectuate a first control of the validity of the card.

Said proximity sensors are well known in the art and can check the presence of a planar metal element, of a wire element, of a ferromagnetic element etc. etc.

In the case that the card inserted is not provided with the sensor element, the proximity sensor, not receiving any flux variation, will not generate the stop signal and the inserted card will be rejected from the machine through the output vent-hole.

In this manner the machine will not effectuate unnecessary operation and the sensor will avoid providing the needles for the drawing of the signal and prevent contact with a foreign material; moreover, no electric power will be used to effectuate unnecessary operations.

In the case that the card is provided with the proper sensor element, the proximity sensor generates the stopping signal and the machine effectuates the following operation cycle. It comprises the following steps:

(a) the vent-hole input is closed so as to avoid the introduction of further cards;

(b) a means for making contact comprising several sensors, e.g. needles, are brought into electrical contact with the small areas 5 of the card.

The size of the small areas of contact must be so as to assure a correct contact, taking into account the little alignment differences due to imperfect manufacturing of the cards.

(c) The card is fixed in a suitable position wherein the card will stay till the end of the operation of the machine;

(d) the machine checks the validity of the card.

To effectuate this check the machine will perform an electronic "diagnosis" on the circuit K.

With this aim the machine will inject, by means of the sensor put into contact with the small areas 13, a proper code signal to which will correspond an output answer at the small area 13a. On the basis of said answer the machine will detect the validity of the card.

Many solutions can be given by nowadays electronic technology for this kind of operation in order to get a high level safety against imitations.

The input signal can be either analog or digital and it can be injected through several input points or a single one, with many or only one time-slot, according to the degree of complexity of the circuit.

When an improper answer appears at the output terminal of the circuit K, the machine will eject the card, as it has been described before, otherwise a second step of operation will be carried on the matrix M.

This matrix, shown in FIG. 3, consists of a set of fuse elements arranged of "n" rows and "n" columns. So there are "n" links on the upper side of the matrix and as many vertically on the left side of the same.

A proper choice of links (one from each side) will allow access to a single fuse.

Heavy lines in the FIG. 3 show the two links A and B and the fuse they single out.

Through the input constituted by the small areas 11, the machine can inject a binary code signal sequentially ordered by ones and zeros to the shift register 8.

In the situation represented in the figure this register has four positions or memories, as many as the vertical inputs of the matrix supplied by them, and it will be fed by a 4-digit or bits sequence, three of which will be "zeros" and the remaining a single "one".

The position of the "one" inside the 4-bits word will determine the ignition of the corresponding switching circuit represented in the figure by a single transistor.

For instance the number "0100" will excite the second transistor which pass into the active region.

A signal similar will be fed to the small area 1 in order to switch on one of the transistor connected with the links of the upper side of the matrix.

A proper pair of binary numbers characterized by the above mentioned properties will allow the switching on of every requested pair of transistors and the connection of the terminals of a specific fuse to the small areas 9 and 10 through the transistor put into conduction.

A suitable voltage level, supplied by the machine to these small areas 9 and 10, will verify whether the fuse characterized by the two binary numbers sent to the small areas 11 and 12 is in conduction or not.

Now it appears to be clear how the machine will operate on the matrix.

When the pair of numbers "1000" and "1000" are sent to the small areas 11 and 12, the fuse belonging to the first row and first column is connected to the small areas 9 and 10. Sensors disposed on these small areas will check the conduction of the fuse. If it is non-conductive, the sensors will go on, checking the next one by the same way.

For example, willing to examine the second one of the first row, number "0100" and "1000" must be sent to the small areas 11 and 12 respectively. If this fuse too is non-conductive, they will go on testing successively all the fuses, in order to find a safe one.

If there is not any safe or conductive fuse element, an illuminated display, with which the machine is provided so as to be easily noticeable, will show a rank of zeros.

Then the card will be returned through the exit hole. On the contrary, if there is at least a fuse in conduction; i.e. there is a recoverable credit on the card, large enough to pay at least a portion of the service, the display will indicate the value corresponding to the unobliterated elements and simultaneously the machine will send a signal of consent in order to effectuate the delivery of the service (the telephone call).

The number of elements of the matrix can be obviously very large and those skilled in the art can modify in a simple way the above-mentioned circuits, employing for instance Binary/Decimal converters to reduce the amount of bits constituting the binary numbers of control.

It must be particularly stressed that from the time the user introduces the card until the credit amount becomes visible on the display takes less than a second; that is less time than it takes to introduce a sufficient number of coins in the telephone apparatus in order to obtain the desired call.

From this moment on, the call is enabled to the user. If there is a reply to the call, the corresponding cost impulses will be furnished to the machine; an electronic equipment will process them acting directly on the matrix and will cancel some fuses by burning them, in a proportion according to the type of call requested.

The remaining amount kept on the card will be represented, brought up to date, on the display so that the user can know at any moment his residual credit and thus the proportional remaining time allowed for the conversation.

When all the fuses of the matrix are burned, there are two possibilities for the user: he can insert a new card or alternatively he can wait for the complete exhaustion of the inserted card. In the second case, after the arrival of the impulse which burns the last fuse, the machine will carry out the following steps, in few milliseconds:

(a) the illuminated display will present a rank of zeros to signify the exhaustion of the card;

(b) the call, after a few seconds, will be interrupted, disengaging the line;

(c) the exhausted card will be returned.

On the other hand, if a new card is inserted, no solution of continuity occurs to the service and the machine will carry out the following steps:

(a) the validity of the new card will be checked;

(b) the matrix will be analysed in order to determine if there is an amount of credit greater than zero.

If the test is positive the machine will eject the first card and will start to operate on the second as above described. The machine will be preferably provided with a floating battery (buffer battery) to assure the completion of the initiated operative cycle and the return of the card in the case of interruption of power supplied by the power line.

As has already been mentioned, only a short time is necessary to complete all the operative steps.

The employment of electronic circuitry having a high degree of technology and the subsequent elimination or extreme reduction of mechanical devices results in a high degree of reliability of the system or in other words a drastic reduction of repair problems due to "out of order".

As previously noted, the machine has not been described in detail because said machine remains defined consequently to the card operation cycle above described; and therefore those who are skilled in the art can easily embody such a machine on the basis of preceding statements, which machine will be provided with a slot for insertion of the card, with an outlet opening for the return of the card, with a proximity sensor (capacity, induction types, etc. etc.) sensitive to the metal element placed on the card, with several sensitive elements which can enter into contact with the said small areas of the card, with conventional operative circuits for injecting the signal into identification circuit of the card, for withdrawing and examining the consequent answer, for sending the proper binary number to the small areas of control, for injecting the low-voltage testing level and the high-voltage burning level to said testing and obliteration terminals and for processing data achieved from the card and sending the corresponding control signal for the card rejection, for its returning, for the enabling and the ending of the service, and finally for exciting and controlling the illuminated display. The present invention has been described with reference to a particular embodiment but it must be stressed that improvements, changes, additions can be made either to the card or to the machine without going beyond the scope of the claims as follows:

What is claimed is:

1. A card for the activation of and payment to a machine in return for services rendered or goods dispensed, said card comprising:

a support base;

card validity check means including a metal element secured to said support base;

an integrated circuit, secured to said support base, including:

fuse means including a plurality of fuse elements which are selectively destroyable in response to passage therethrough of current above a predetermined level, for retaining an electrical representation of a monetary value;

switching means responsive to test signals applied thereto for passing current selectively through individual fuse elements; and metalized contact areas through which said integrated circuit is able to make contact with said machine.

2. A card in accordance with claim 1, wherein said fuse means comprises a matrix of "n" rows in "n" columns of said fuse elements, each fuse element having two connections, one connection connected to all other fuse elements in the respective row and said other connection connected to all other fuse elements in the respective column, said fuse elements indicating conductivity when passing a current below said predetermined level and being destroyed and consequently indicating an open circuit upon passing a current above said predetermined level.

3. A card in accordance with claim 2, wherein said fuse elements are diodes.

4. A card in accordance with claim 2, wherein said switching means comprises two shift registers, each register having "n" memory locations, each location having an output, the memory locations of one shift register corresponding to rows of fuse elements and the memory locations of the other shift register corresponding to columns of fuse elements.

* * * * *